United States Patent [19]

Schwarz et al.

[11] Patent Number: 5,434,732
[45] Date of Patent: * Jul. 18, 1995

[54] BALANCED CANTILEVERED HEAD POSITIONING MECHANISM FOR MULTITRACK TAPE RECORDER

[75] Inventors: Theodore A. Schwarz, Woodbury; Durkee B. Richards, Stillwater; Robert J. Youngquist, White Bear Lake, all of Minn.

[73] Assignee: Minnesota Mining and Manufacturing Company, St. Paul, Minn.

[*] Notice: The portion of the term of this patent subsequent to Jun. 3, 2012 has been disclaimed.

[21] Appl. No.: 113,837

[22] Filed: Aug. 30, 1993

Related U.S. Application Data

[63] Continuation-in-part of Ser. No. 867,985, Apr. 13, 1992, abandoned.

[51] Int. Cl.⁶ .......................... G11B 5/584; G11B 5/55
[52] U.S. Cl. ..................................... 360/109; 360/106; 360/77.12; 360/78.02
[58] Field of Search ............... 360/109, 105, 106, 104, 360/78.02, 78.05, 77.12

[56] References Cited

U.S. PATENT DOCUMENTS

| | | | |
|---|---|---|---|
| 3,692,255 | 9/1972 | Von Behren | 242/192 |
| 4,275,427 | 6/1981 | Bjordahl | 360/106 |
| 4,313,143 | 1/1982 | Zarr | 360/106 |
| 4,713,707 | 12/1987 | Heizmann | 360/106 |
| 4,717,978 | 1/1988 | Ichinose | 360/106 |
| 4,750,067 | 6/1988 | Gerfast | 360/106 |
| 4,858,047 | 8/1989 | Cannon et al. | 360/106 |
| 5,166,848 | 11/1992 | Plachy | 360/109 |
| 5,191,492 | 3/1993 | Nayak et al. | 360/78.02 |
| 5,198,947 | 3/1993 | Nayak et al. | 360/109 |

FOREIGN PATENT DOCUMENTS

| | | |
|---|---|---|
| 0148999 | 7/1985 | European Pat. Off. |
| 0243164 | 10/1987 | European Pat. Off. |
| 2-249119 | 10/1990 | Japan |

*Primary Examiner*—John H. Wolff
*Assistant Examiner*—Craig A. Renner
*Attorney, Agent, or Firm*—Gary L. Griswold; Walter N. Kirn; Charles L. Dennis, II

[57] ABSTRACT

A mechanism for accurately positioning a recording/playback head on the center of a track including a stepper motor and coil assembly in combination controlling coarse and fine transverse head position. The coil is attached to a pivoting actuator arm which provides a mounting member for a recording/playback head. A torsion spring is attached to the actuator arm and to a stage which is driven by a stepper motor lead screw to incrementally position the actuator arm. The coil assembly operates to pivot the recording/playback head transversely, thereby providing fine position control, and is mounted together with other members at either sides of a pivot axis to provide a dynamically balanced structure.

17 Claims, 3 Drawing Sheets

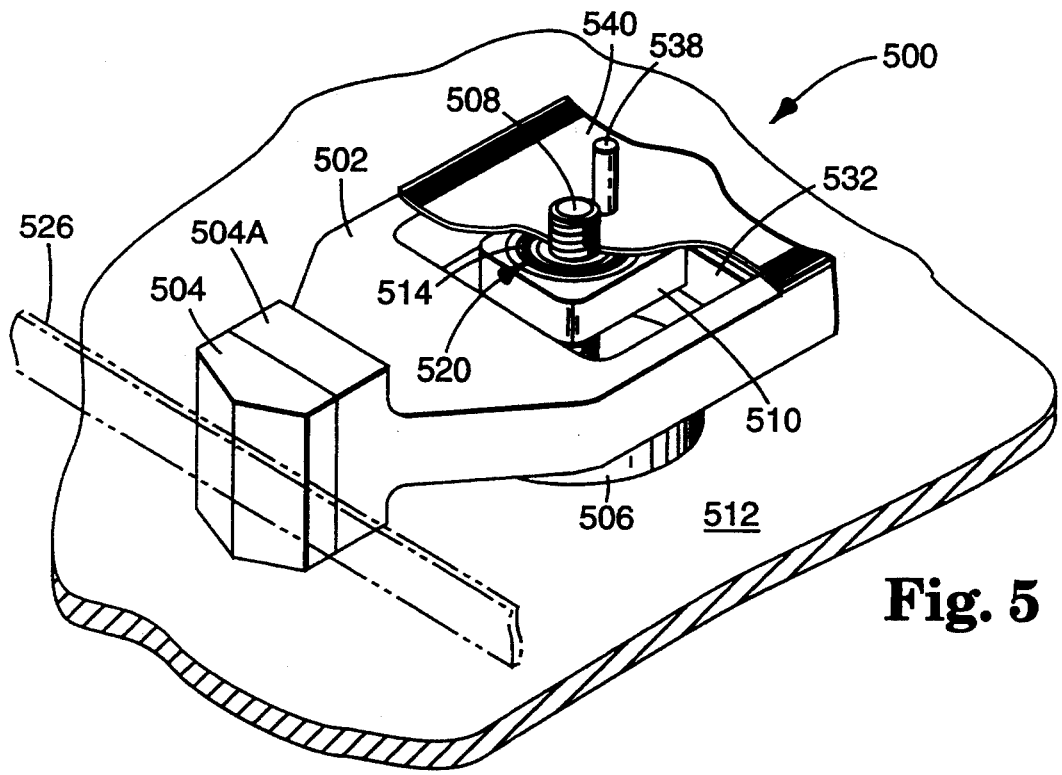
Fig. 5
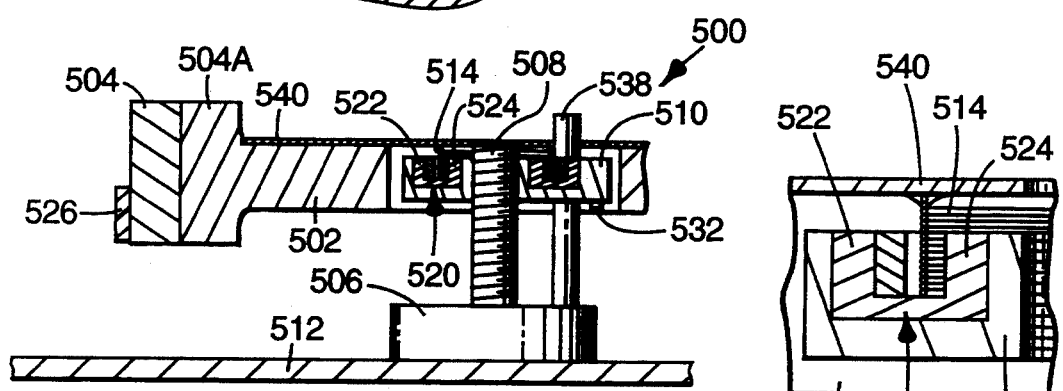
Fig. 6A
Fig. 6C
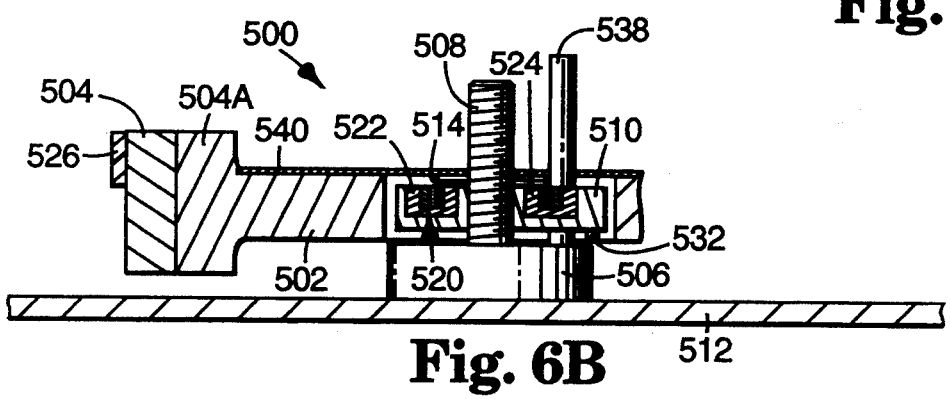
Fig. 6B

BALANCED CANTILEVERED HEAD POSITIONING MECHANISM FOR MULTITRACK TAPE RECORDER

CROSS REFERENCE TO RELATED APPLICATION

This application is a continuation-in-part of U.S. application Ser. No. 07/867,985, filed Apr. 13, 1992, entitled Head Positioning Mechanism for Multitrack Tape Recorder, now abandoned.

BACKGROUND OF THE INVENTION

1. Field of the Invention

The present invention relates to magnetic tape recorders and to subassemblies utilized therein, particularly with respect to recorders adapted for multiple track recording using a multiple track head which is responsive to servo signals and transversely movable with respect to the recording tape.

2. Description of the Prior Art

Data recording cartridges and recorders adapted for their use are disclosed and claimed in U.S. Pat. No. 3,692,255 (Von Behren). The cartridge there disclosed includes an enclosure together with an endless flexible belt in frictional contact with the tape on both reel hubs for bidirectionally driving the tape. The cartridge can operate to drive the tape with rapid accelerations and decelerations, such as are encountered in digital data recording and playback. Recorders adapted to use such data cartridges originally employed fixed, multitrack heads which were complex, expensive and difficult to maintain in proper alignment.

To eliminate the multitrack heads, U.S. Pat. No. 4,313,143 (Zarr) disclosed a head positioning mechanism by which a single track head could be transversely positioned with respect to the width of the recording tape to enable recording and playback of any of a plurality of parallel tracks.

U.S. Pat. No. 4,750,067 (Gerfast) discloses a head positioning mechanism for a multitrack data cartridge recorder including a stepper motor, a lead screw driven by the stepper motor and a head mounting slide engaged with the lead screw by a partial female thread. The Gerfast mechanism moves a recording/playback head transverse to the path of a magnetic recording tape.

While the Gerfast mechanism works satisfactorily for some applications, a need has recently arisen to provide a mechanism which more accurately positions a magnetic recording head on the center of a selected track in response to servo signals derived from servo information carried on certain tracks on a multitrack tape. This accurate positioning is required to allow substantially higher track densities on recording tape.

The present invention offers a magnetic recording head responsive to such servo signals having the advantage of offering an extremely compact head mechanism. A further advantage of the head mechanism provided by the instant invention is that it is nearly crashproof. The mechanism of the present invention also significantly reduces undesirable translational reactionary resonances which are typically present in prior art head mechanisms.

SUMMARY OF THE INVENTION

In contrast to any of the techniques previously employed, the present invention provides a head positioning mechanism for a data cartridge recorder which variably positions a recording/playback head transversely with respect to a transport path along which the tape may be moved, enabling the head to be positioned with very close tolerances. The present mechanism includes a base, a coarse positioner and a fine positioner. In particular, the fine positioner includes an actuating arm which is rigidly secured to the head and a member which pivotally mounts the actuating arm to allow pivoting of the arm about an axis so as to transversely move the head a minute distance. The arm is positioned by a driver responsive to a fine position control signal for pivotally driving and positioning the actuating arm, such that the head secured to the arm may be positioned in relation to the center of a selected one of a plurality of parallel data tracks.

In this invention, the actuating arm comprises a central portion at which the pivotally mounting member is secured, a first end section at which the head may be secured, and a second end portion opposite from and having substantially the same moment of inertia with respect to said axis as the first end portion and head. The arm is, therefore substantially dynamically balanced about the axis.

In a preferred embodiment, the mechanism for pivotally driving and positioning the actuating arm comprises a coil assembly including a coil bundle attached to the actuating arm and adapted to be energized by the fine position control signal and means for applying a magnetic force to the coil bundle. Further, the coil bundle may be preferably secured proximate the first end portion of the arm, and the second end portion may preferably include electronic circuitry for processing record/playback signals, the net moment of inertia of each respective end portion relative to said axis being about the same. In the latter case, the location of the circuitry on the arm and thus still proximate to the head minimizes signal loss and distortion. The means for applying magnetic force to the coil bundle is preferably a permanent magnet magnetically coupled to the coil bundle. Such a magnet may be secured to either the base or a stage, the transverse position of which is controlled by the coarse positioner.

BRIEF DESCRIPTION OF THE DRAWING

The present invention will be more thoroughly described with reference to the accompanying drawings, herein like numbers refer to like parts in the several views, and wherein:

FIG. 5 is an isometric view of another embodiment of a head positioning assembly according to the present invention;

FIG. 6A is a cut-away side view of the embodiment of FIG. 5 showing the magnetic head assembly in a fully extended position;

FIG. 6B is a cut-away side view of the embodiment of FIG. 5 showing the magnetic head assembly in a bottom position; and FIG. 6C is an expanded cut-away side view of the voice coil positioning mechanism used in the embodiment of FIGS. 5, 6A and 6B.

DETAILED DESCRIPTION OF THE PREFERRED EMBODIMENT

Figure 1:
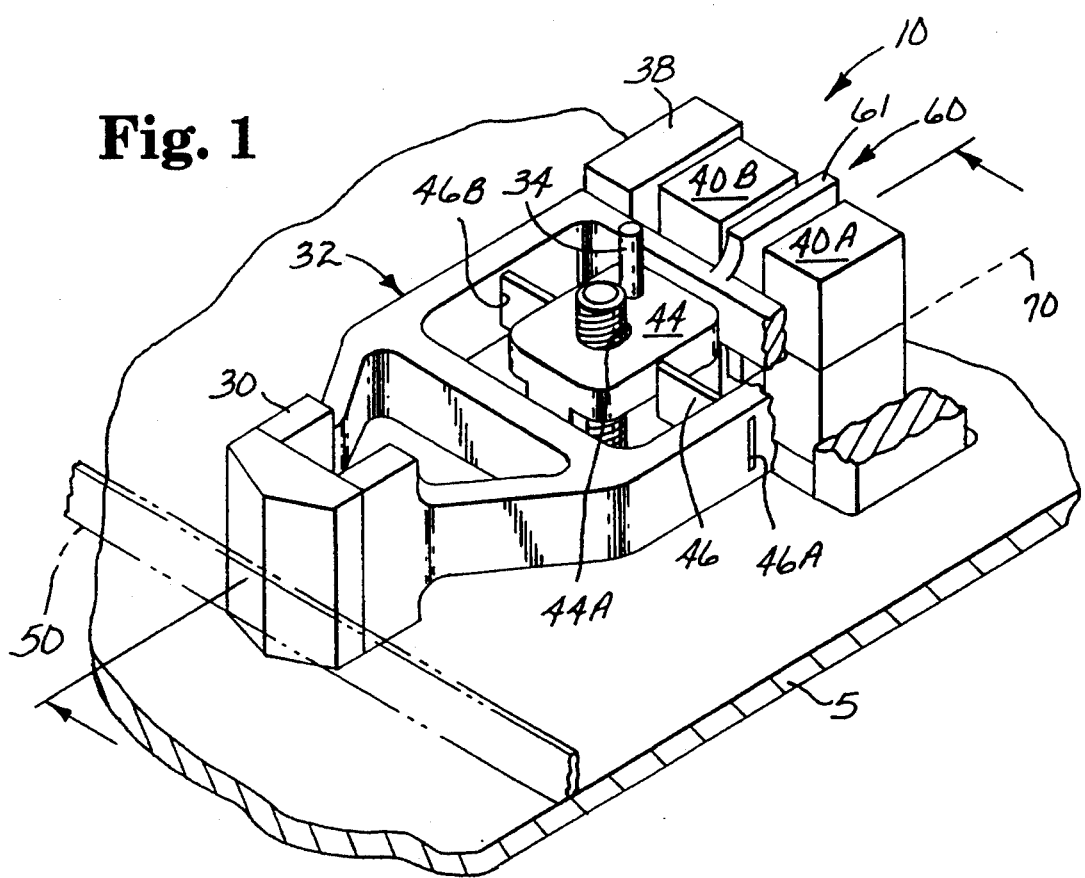
FIG. 1 is an isometric view of one embodiment of a magnetic head positioning assembly as set forth in the aforementioned parent application U.S. Ser. No. 07/867,985.
Figure 2A:
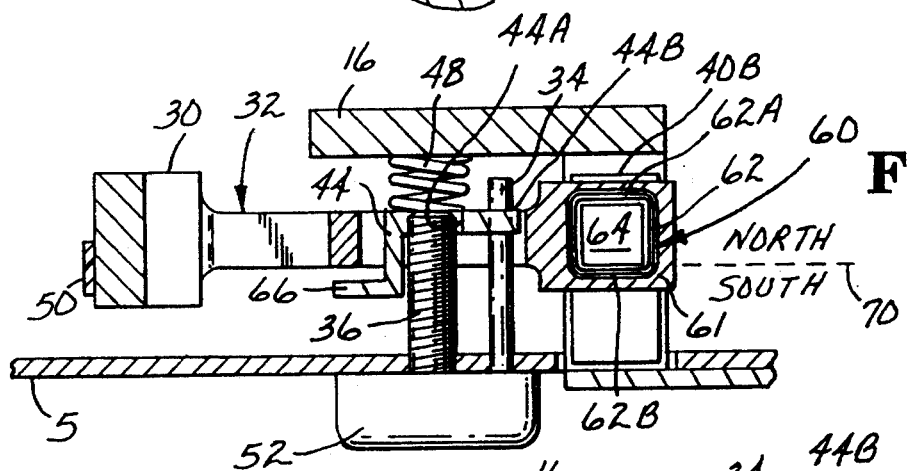
FIG. 2A is a cut-away side view of the embodiment of FIG. 1 showing the magnetic head assembly in a fully extended position.
Figure 2B:
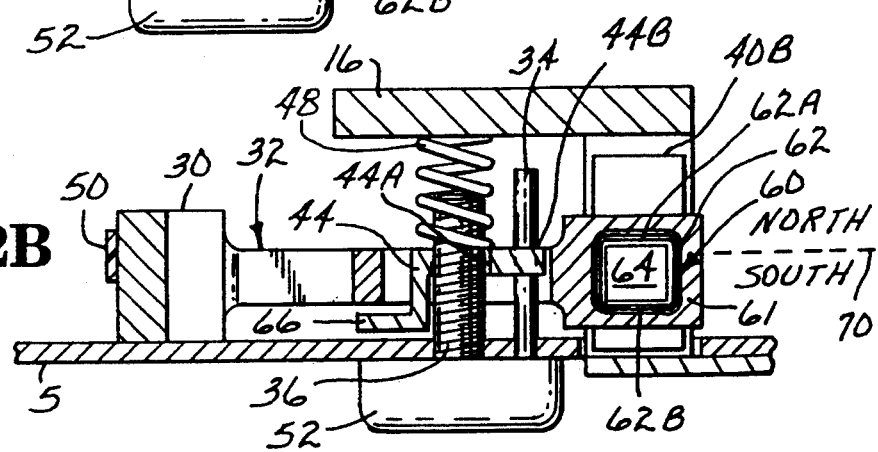
FIG. 2B is a cut-away side view of the embodiment of FIG. 1 showing the magnetic head assembly in a bottom position.

Now referring to FIG. 1 which shows an isometric view of one embodiment of a magnetic head positioning assembly. As there is seen, the magnetic head assembly 10 includes a pivoting actuator arm 32 including a magnetic recording head assembly 30 rigidly affixed thereto. A stepper motor 52, such as is shown in FIGS. 2A and 2B, drives a lead screw 36 which, in turn moves the stage 44 in a vertical direction perpendicular to the surface of a base 5. A coil assembly 60 is attached to one end of the rotating actuator arm 32. As best shown in the side cut-away view FIG. 2A, the coil assembly 60 comprises a coil frame 61, a coil 62 and a mandrel 64. The coil 62 comprises an upper portion 62A and a lower portion 62B. A recording tape 50 having data contained on a multiplicity of parallel tracks moves along a transport path across the head assembly 30.

The head mounting assembly 10 further includes a stage 44 having a bottom surface affixed to a torsion spring 46 which traverses the width of the rotating actuator arm 32. Torsion spring 46 is rigidly coupled at its ends 46A, 46B to opposing sides of the rotating actuator arm 32. The stage 44 includes apertures 44A and 44B which are sized to receive the lead screw 36 and an anti-rotation pin 34. Aperture 44A may advantageously be a half-nut aperture, slightly larger than necessary to accommodate the lead screw 36 so as to allow for movement of the actuating arm 32 in a direction normal to the plane of the tape to assure constant loading at the tape head interface. The aperture 44A is constructed to also allow pivotal movement of the magnetic head assembly. The pin 34 and the lead screw 36 are affixed in a well-known manner to a stepper motor 52. The pin 34 allows movement of the stage 44 in a direction perpendicular to the surface of the base 5 but minimizes rotation or movement in other directions. The stepper motor 52 turns the lead screw in response to control signals applied using well-known techniques.

Referring to FIGS. 1 and 2A, a magnet housing 38, advantageously in the form of a metal U-shaped frame, is rigidly mounted to the fixed base 5. The magnet housing 38 is preferably substantially comprised of steel material. Magnets 40A and 40B are rigidly affixed to facing sides of the magnet housing using epoxy, for example. Magnets 40A and 40B may preferably be comprised of split magnets having, for example, a top portion being a north pole and a bottom portion being a south pole whose heights are equal or greater than the stepper motor translational distance plus the width of the coil bundle. The north and south poles of each magnet may be advantageously split at the approximate center of the vertical height of the magnets as indicated by broken line 70. The magnet housing 38 is mounted to the baseplate, as is the stepper motor 52. The steel housing serves as a return path for the magnetic flux. The magnet housing is also used to stiffen the baseplate in the region wherein it is mounted. The base 5 is cut out in the region of the assembly to allow installation and movement of the assembly. Coil assembly 60 is movably juxtaposed between the magnets 40A and 40B so as to allow pivotal movement of the frame and, consequently, the entire magnetic head assembly transversely to the direction of motion of the magnetic tape as the tape moves across the head assembly 30.

Now referring particularly to FIG. 2A, a cut-away side view of the example of the invention illustrated in FIG. 1 is shown wherein the magnetic head assembly 10 is in a raised position relative to the tape 50. A load spring 48 is retained between a plate 16 mounted on the magnet housing 38 and the stage 44. The lead screw 36 may advantageously be positioned within the load spring 48 which may advantageously comprise a compliant coil spring having a sufficiently large diameter to accommodate the lead screw 36.

In operation, the stepper motor 52 is used to coarsely position the head from track to track and the voice coil responds to a servo signal in a track following mode to make extremely small adjustments, as for example, within microinches or micrometers, to follow the center of the selected track. The torsion spring and voice coil design give the mechanism of the invention the ability to dynamically track the servo signal. Higher track density data cartridges are now made technically feasible as compared with conventional methods found in the prior art.

The stepper motor 52 drives the stage 44 through the lead screw 36 which provides for substantially zero backlash with slight interference. The stage is heavily loaded, the loading approaching the lifting capacity of the stepper motor and lead screw. Loading is achieved by the compression spring 48 to prevent movement of the stage or lead screw after locking into position and to minimize resonance from this portion of the mechanism. The rotating actuator arm 32 is attached to the stage 44 by the torsion spring 46 to eliminate any translational movement during rotation. In one embodiment of the invention, the torsion spring holds the arm several mils above the stage.

For some applications, a stop 66 is advantageously employed. The stop 66 may advantageously be, for example, an "L-shaped" member which extends from a portion of the stage 44 under and in proximity to the cross member of arm 32. Stop 66 serves as a crash stop and limits the motion of the arm to a few minutes of rotation in a direction substantially transverse to the direction of movement of the tape 50. An electrical current of sufficient magnitude, herein called a head location signal, may be applied in a well known manner to coil 62 in order to drive the cross member of arm 32 against the crash stop 66. The head location signal may be applied to the coil 62 in order to lock the head assembly 30 against the crash stop 66, thereby holding the head assembly 30 in a fixed position relative to the stage 44. In this way the position of the head assembly may be located in the absence of a servo signal on the tape. Alternatively, if the magnetic head assembly of the invention is used in a stepper mode only configuration, that is a configuration that does not use track following servo signals, the crash stop 66 provides protection against vibration and shock. Those skilled in the art will recognize that variations of the embodiment shown are readily ascertainable, such as employing multiple crash stops extending from the stage, and the invention is not to be considered as to be limited by the example discussed herein.

The forward portion of the arm 32 is a simple rigid box terminated in a frame which secures the head. In the implementation shown, the arm height is less than its length to allow the moving mechanism to translate about 150 mils to access all tape tracks, yet allow the entire assembly to fit nominally within a 1.0 inch (2.5 cm) height profile. The rear portion of the arm 32 holds the coil. The minimum separation of the inner turn of the upper and lower portion of the coil is about 250 mils to allow the coil to be operated at full power whether the mechanism is at the bottom position or the fully extended position. The length of the coil is determined by the force required to rotate or pivot the actuator properly at the desired frequency and acceleration. The coil is wrapped around and bonded to a mandrel 64 which is epoxied into a frame at the rear of the arm, forming a rigid body. The mandrel is weighted to balance the rotating arm about its axis, reducing translational reactionary forces.

Figure 3:
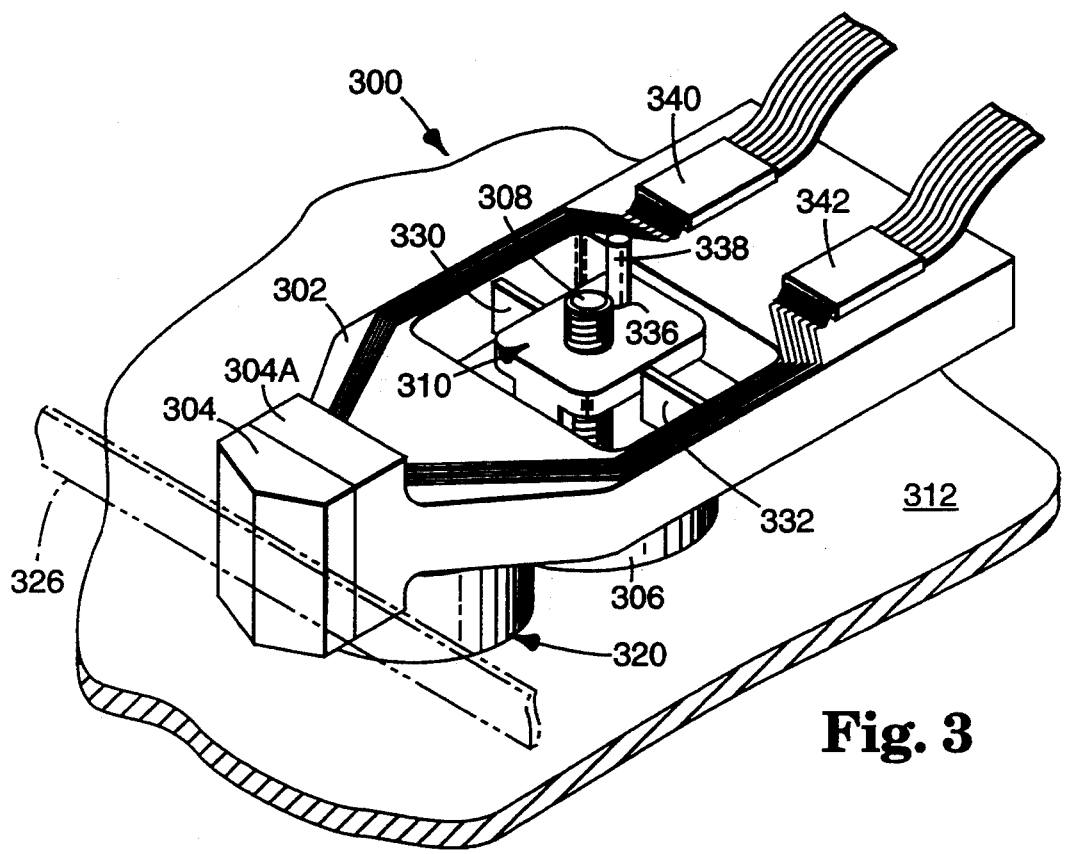
FIG. 3 is an isometric view of a head positioning assembly according to the present invention.

FIG. 3 shows an isometric view of one embodiment of a magnetic head positioning assembly of the present invention. As there is seen, the magnetic head assembly 300 includes a pivoting actuator arm 302 including a magnetic recording head assembly 304 rigidly affixed thereto. A stepper motor 306 drives a lead screw 308 which, in turn moves a stage 310 in a vertical direction perpendicular to the surface of a base 312. A coil assembly 314 (See FIGS. 4A and 4B) is attached to one end of the pivoting actuator arm 302. As best shown in the cut-away side views of FIGS. 4A & B, the coil assembly 314 comprises a coil 316 mounted on the distal end of a support tube 318, the opposite end of which is secured to the arm 302. The coil assembly 314 is mounted so as to be freely received into a magnet assembly 320 which includes an outer cylindrical portion 322 having a first polarity and an inner cylindrical portion 324 having the opposite polarity. A recording tape 326 having data contained on a multiplicity of parallel tracks moves along a transport path across the head assembly 304.

Figure 4A:
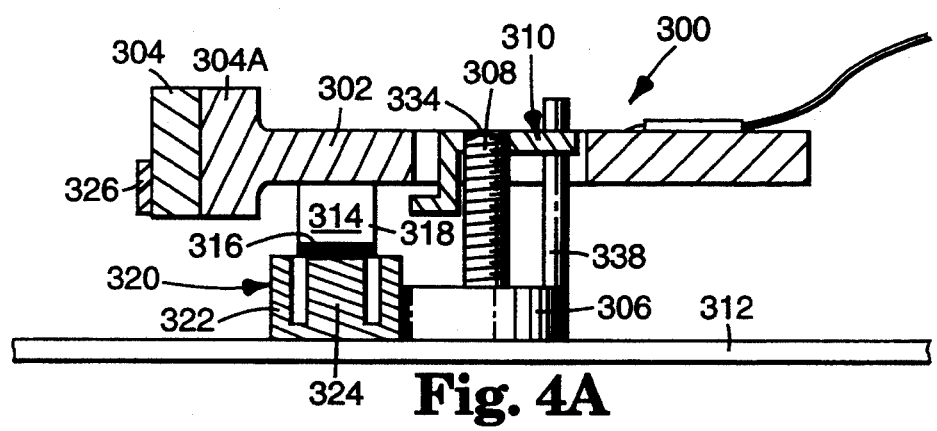
FIG. 4A is a cut-away side view of the embodiment of FIG. 3 showing the magnetic head assembly in a fully extended position.
Figure 4B:
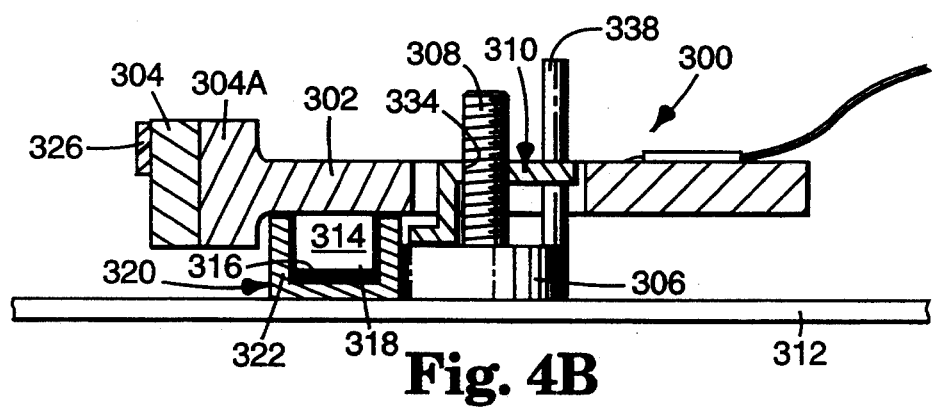
FIG. 4B is a cut-away side view of the embodiment of FIG. 3 showing the magnetic head assembly in a bottom position.

The arm 302 of the head mounting assembly 300 is further shown in FIGS. 3 and 4A-B to be mounted to the stage 310 by means of torsion springs 330 and 332, just as previously described in conjunction with FIGS. 1 and 2A-B. Similarly, the stage 310 includes a first aperture 334 threaded to receive the lead screw 308 and a second aperture 336 sized to provide clearance for an anti-rotation pin 338. As described earlier, the stepper motor 306 turns the lead screw 308 in response to control signals applied using well-known techniques to control the coarse transverse position of the head 304.

Referring further to FIGS. 3 and 4A-B, the arm 302 extends on both sides of a pivot axis defined by the torsion springs 330 and 332, with the head 304, a head mounting structure 304A and coil 316 comprising most of the mass at one end. The opposite end of the arm 302 carries members 340 and 342 which are positioned such that their mass and location result in a moment of inertia substantially the same as that of the opposite end of the arm such that the entire arm 302 and members carried thereon are substantially balanced about the axis of the springs 330 and 332.

The magnet assembly 320 is rigidly mounted to the fixed base 5, and is preferably substantially comprised of steel pole pieces and a permanent magnet base. The coil 316 is movably juxtaposed between the outer and inner pole pieces 322 and 324 so as to allow pivotal movement of the frame and, consequently, the entire magnetic head assembly transversely to the direction of motion of the magnetic tape 326 as it moves across the head assembly 304.

Now referring particularly to FIGS. 4A and B, cut-away side views of the example of the invention illustrated in FIG. 3 are shown. In FIG. 4A, the magnetic head assembly 300 is shown in a raised position relative to a tape 326, such as may be carried by a tape cartridge, not shown, while in FIG. 4B, the assembly is in a lowered position, depending on the location of the stage 310 as controlled by the lead screw 308. The coil and tube 318 in which the coil is mounted, together with the magnet 320 are thus made so that the magnetic coupling therebetween is substantially constant over the entire range of movement allowed by the lead screw.

In operation, the stepper motor 306 is energized by a coarse position control signal used to coarsely position the head from track to track, and the coil 316 responds to a servo signal in a track following mode to make extremely fine adjustments, as for example, within microinches or micrometers, to follow the center of the selected track. By dynamically balancing the respective members about an axis defined by the torsion springs, the mechanism of the invention has an enhanced ability to dynamically track the servo signal at still higher track densities than previously.

In the embodiments described in FIGS. 1-2A,B and FIGS. 3-4A,B, the coil-magnet structures providing fine position control have been located either at an end of the actuating arm opposite that of the head or at the same end of the arm as that of the head. In both instances, the arm is still pivoted about an axis defined by the torsion springs, but which none-the-less coincides with that of the lead screw. And, in both embodiments, the magnet structure which interacts with the coil is mounted on a base.

In an alternative embodiment shown in FIGS. 5 and 6A-C, a substantially different configuration is used. As in the previous embodiments, the magnetic head assembly 500 still includes a pivoting actuator arm 502 including a magnetic recording head assembly 504 rigidly affixed thereto. And a stepper motor 506 still drives a lead screw 508 which, in turn moves a stage 510 in a vertical direction perpendicular to the surface of a base 512.

In this embodiment, however, the magnet assembly 520 (See FIGS. 6A and 6B) is attached to the stage 510, coaxial with the lead screw 508. The arm 502 is still pivotally mounted to the stage 510 by means of a torsion spring, however, in this case the spring 532 is secured at the rear end of the stage, away from the head, and not coaxial with the lead screw. And, as best shown in the side cut-away views of FIG. 6A-C, the coil assembly 514 is secured to a cover plate 540, which has clearance apertures allowing the lead screw 508 and anti-rotation pin 538 to freely extend therethrough, and which is rigidly attached to the arm 502.

As in FIGS. 3 and 4A-B, the coil assembly 514 is mounted so as to be freely received into the magnet assembly 520, which includes an outer cylindrical portion 522 having a first polarity and an inner cylindrical portion 524 having the opposite polarity. The magnet assembly 520 is secured within an annular recess in the stage 510, and thus moves up and down therewith. As shown in the FIGS. 6A & 6C, the coil 514 thus need only have a range of movement necessary to pivot the cover and arm, thus providing the fine position control.

A recording tape 526 having data contained on a multiplicity of parallel tracks moves along a transport path across the head assembly 504. As described earlier, the stepper motor 506 turns the lead screw 508 in response to control signals applied using well-known techniques to control the coarse transverse position of the head 504.

While cut-away in right side of FIGS. 6A and B, the arm 502 still extends on both sides of the pivot axis defined by the torsion spring 532, with the head 504, and a head mounting structure 504A comprising most of the mass at one end while the opposite end of the arm 502 carries members (not shown) which are positioned such that their mass and location result in a moment of inertia substantially the same as that of the opposite end of the arm such that the entire arm 502 and members carried thereon are substantially balanced about the axis defined by the spring 532.

In the embodiments described hereinabove, the torsion springs 46, 330, 332, and 532 have been flat members vertically positioned to allow the arm to both pivot about the axis and to deflect away from the transport path, the latter feature thus facilitating constant loading of the head at the head/tape interface, It is also within the scope of the present invention that such springs may have a cross-shaped cross section, or that they may be formed of tubular or solid rods. Such embodiments may further improve the lateral stiffness, normal to the plane of the tape.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. In a tape drive adapted for recording and playing back data from any one of a plurality of parallel data tracks extending along a length of magnetic recording tape, in which the tape drive includes at least one recording/playback head which is adapted to interface with the tape along a tape transport path and to be variably positioned transversely with respect to the tape length, a recording/playback head positioning mechanism comprising:
   a. a base;
   b. linear positioning means including driving means secured to said base and a stage engaged with said driving means for coarsely positioning said stage transversely with respect to said tape length;
   c. actuating arm means including means for rigidly securing said recording/playback head thereto;
   d. means for pivotally mounting said actuating arm means to said stage so as to allow pivoting of the arm means about an axis parallel to said transport path; and
   e. means responsive to a fine position control signal for pivotally driving and positioning the actuating arm means to finely position said at least one head secured to said actuating arm means in relation to the center of a selected one of the plurality of parallel data tracks, and
   wherein said actuating arm means comprises a central portion at which said pivotally mounting means is secured, a first end portion at which said head is secured, and a second end portion opposite from and having substantially the same moment of inertia with respect to said axis as the first end portion and said head so as to substantially dynamically balance the actuating arm means about said axis.

2. A mechanism according to claim 1, wherein said pivotally driving and positioning means comprises a coil assembly including a coil bundle attached to said actuating arm means and adapted to be energized by said fine position control signal and means for applying a magnetic force to said coil bundle, and wherein said second end portion includes electronic circuitry for processing record/playback signals, the net moment of inertia of each respective end portion relative to said axis being about the same, while the location of said circuitry proximate to said head minimizes signal loss and distortion.

3. A mechanism according to claim 2, wherein said coil bundle is attached to a first end of said actuating arm means.

4. A mechanism according to claim 2, wherein said magnetic force applying means includes a magnet coupled to said base and having a recess therein for receiving said coil bundle, and said coil bundle includes windings extending a distance sufficient to enable magnetic coupling with said magnet over the range of movement provided by said linear positioning means.

5. A mechanism according to claim 4, wherein said coil bundle is attached to a first end of said actuating arm means.

6. A mechanism according to claim 2, wherein said magnetic force applying means includes a magnet coupled to said linear positioning means and has a recess therein for receiving said coil bundle, and said coil bundle includes windings extending a distance into said recess sufficient to enable magnetic coupling over the range of movement provided by said pivotally mounting means.

7. A mechanism according to claim 2, wherein said linear positioning means further comprises incremental driving means including:
   a. a stepper motor secured to said base relative to said tape transport path and having a drive shaft rotatably mounted therein, and
   b. wherein said drive shaft engages said stage to convert rotary motion of the shaft into a corresponding linear movement of the stage, wherein said coil bundle is attached to said actuating arm means coaxial with said drive shaft, and said pivotally mounting means is secured to said stage so as to pivot the stage about an axis other than that extending through the drive shaft.

8. In a tape drive adapted for recording and playing back data from any one of a plurality of parallel data tracks extending along a length of magnetic recording tape, in which the tape drive includes a housing and in which at least one recording/playback head is adapted to interface with the tape along a tape transport path and to be variably positioned transversely with respect to the tape length, a head positioning mechanism comprising:
   a. a base;

b. linear support means secured to the base generally parallel with the plane of the recording tape along the transport path;

c. actuating arm means rigidly attached to said at least one head for supporting said head;

d. means for coarsely positioning said at least one head in a selected coarse track position in relation to a selected one of the parallel data tracks, wherein the coarse positioning means includes a stage slideably engaged to the linear support means;

e. means for pivotally mounting the actuating arm means to the stage so as to allow pivoting of the arm means about an axis parallel to said transport path and for providing torsional force to maintain the actuating arm means at a center position normal to the tape transport path while eliminating any transverse movement during pivoting of the actuating arm means, wherein the pivotal mounting means is secured to the stage and has first and second ends individually affixed to respective opposing sides of the actuating arm means; and f. means attached to the actuating arm means for finely positioning said at least one head in relation to the center of a selected one of the data tracks, wherein said actuating arm means comprises a central portion at which said pivotally mounting means is secured, a first end portion at which said head is secured, and a second end portion opposite from and having substantially the same moment of inertia as the first end portion and said head so as to substantially dynamically balance the arm means about said axis.

9. A mechanism according to claim 8, wherein said finely positioning means comprises a coil assembly including a coil bundle attached to said actuating arm means and adapted to be energized by a fine position control signal and means for applying a magnetic force to said coil bundle, and wherein said second end portion includes electronic circuitry for processing record/playback signals, the net moment of each respective end portion relative to said axis being about the same, while the location of said circuitry proximate to said head minimizes signal loss and distortion.

10. A mechanism according to claim 9, wherein said coil bundle is attached to a first end of said actuating arm means.

11. A mechanism according to claim 9, wherein said magnetic force applying means includes a magnet coupled to said base and having a recess therein for receiving said coil bundle, and said coil bundle includes windings extending a distance into said recess sufficient to enable magnetic coupling with said magnet over the range of movement provided by said linear positioning means.

12. A mechanism according to claim 9, wherein said magnetic force applying means includes a magnet coupled to said linear positioning means and having a recess therein for receiving said coil bundle, and said coil bundle includes windings extending a distance into said recess sufficient to enable magnetic coupling over the range of movement provided by said pivotally mounting means.

13. A mechanism according to claim 8, wherein said coarse positioning means further comprises incremental driving means including:
a. a stepper motor secured to said base relative to said tape transport path and having a drive shaft rotatably mounted therein, and
b. wherein said drive shaft engages said stage to convert rotary motion of the shaft into a corresponding linear movement of the stage.

14. A mechanism according to claim 8, further comprising means for allowing movement of said actuating arm means relative to said base in a direction normal to the plane of the tape to assure constant loading of said at least one head at its interface with the tape.

15. A mechanism according to claim 14, wherein said movement allowing means comprises the pivotally mounting means which allows both the pivot and normal direction movement.

16. In a tape drive adapted for recording on and playing back data from any one of a plurality of parallel recording tracks and a plurality of parallel playing tracks extending the length of a recording tape and in which at least one recording/playback head is adapted to interface with the tape along a tape transport path and to be variably positioned transversely with respect to the tape, a head positioning mechanism comprising:
a. a base;
b. a frame including a head mounting member for attaching the recording/playback head, and further comprising first and second opposing arms;
c. first and second torsion springs having opposing ends wherein one end of each of the first and second torsion springs are secured to the first and second opposing arms, respectively;
d. a coarse positioning means mounted on the base for coarsely positioning said at least one head in a selected coarse track position in relation to a selected one of the parallel recording tracks, wherein the coarse positioning means includes linear support means secured generally perpendicularly to the direction of motion of the recording tape and a stage slideably engaged to the linear support means, wherein the other ends of the first and second torsion springs are individually attached to respective opposite sides of the stage, and wherein the torsion springs apply a force substantially transversely to the direction of movement of the tape;
e. means for finely positioning said at least one head in relation to the center of a selected one of the parallel recording tracks wherein the fine positioning means comprises a voice coil assembly mounted on the frame, the voice coil assembly including a voice coil; and
f. means for applying a magnetic force to the voice coil, the magnetic force means comprising a permanent magnet assembly magnetically coupled to said voice coil, the voice coil and magnet operating to drive the recording/playback head transversely to the direction of movement of the tape by applying a positioning force,
wherein said frame comprises a first end portion at which said head is secured, and a second end portion opposite from and having substantially the same moment of inertia as the first end portion and said head so as to substantially dynamically balance the frame about a pivot axis defined by said torsion springs.

17. A mechanism according to claim 16, wherein said coarse positioning means further comprises incremental driving means including:
a. a stepper motor secured to said base relative to said tape transport path and having a drive shaft rotatably mounted therein, and
b. wherein said drive shaft engages said stage to convert rotary motion of the shaft into a corresponding linear movement of the stage.

* * * * *